J. F. O'CONNOR.
HIGH CAPACITY FRICTION SHOCK ABSORBING MECHANISM.
APPLICATION FILED AUG. 23, 1918.
1,305,665.
Patented June 3, 1919.
2 SHEETS—SHEET 1.
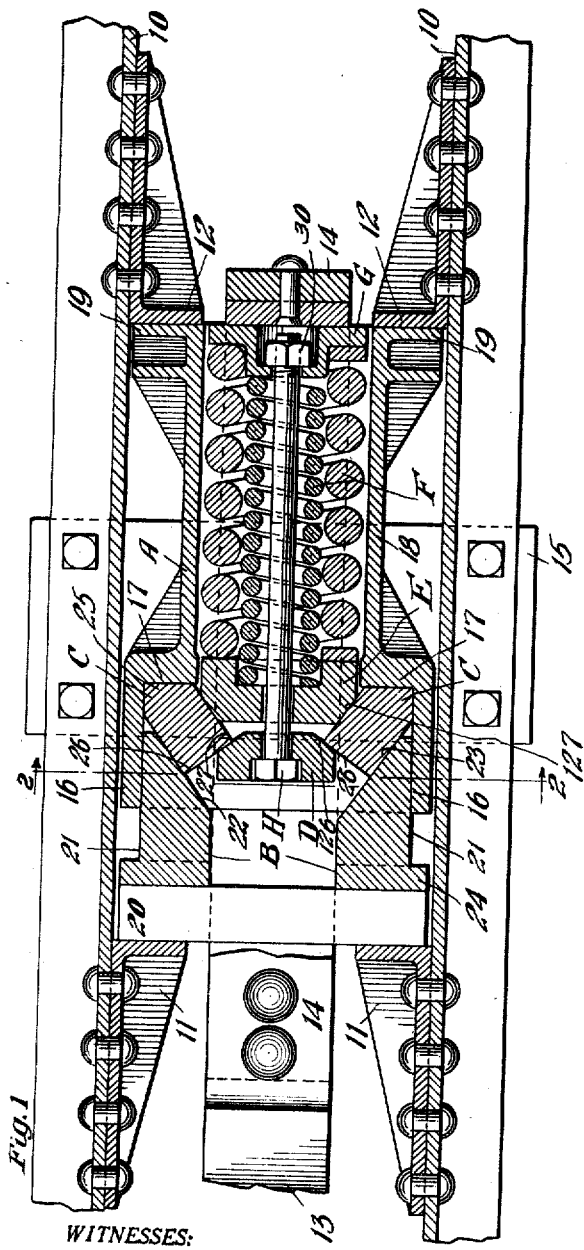
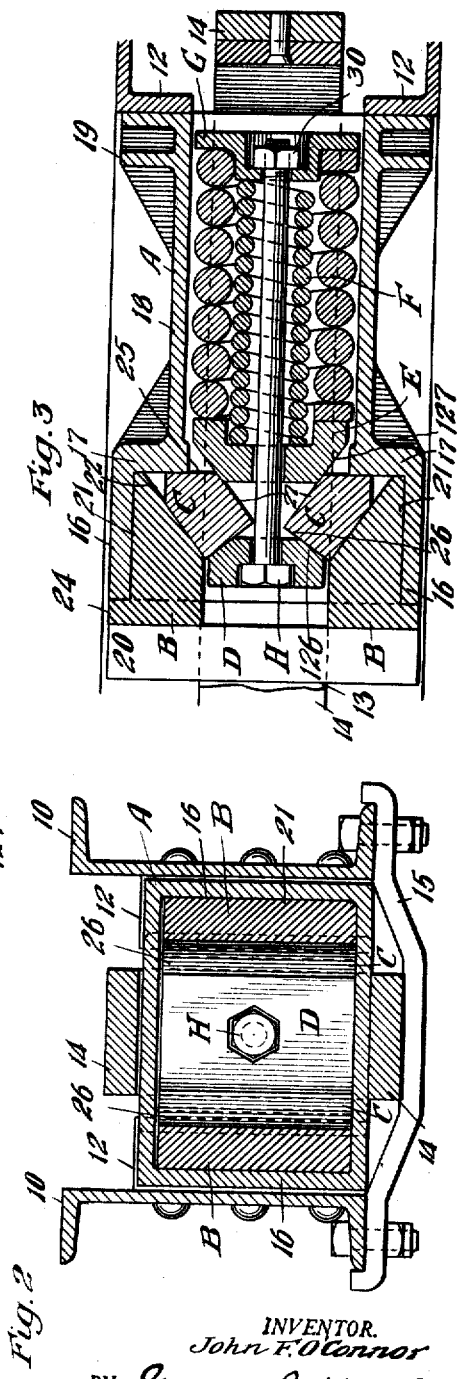
WITNESSES:
Wm. Geiger
INVENTOR.
John F. O'Connor
BY George I. Haight
ATTORNEY J. F. O'CONNOR.
HIGH CAPACITY FRICTION SHOCK ABSORBING MECHANISM.
APPLICATION FILED AUG. 23, 1918.
1,305,665.
Patented June 3, 1919.
2 SHEETS—SHEET 2.
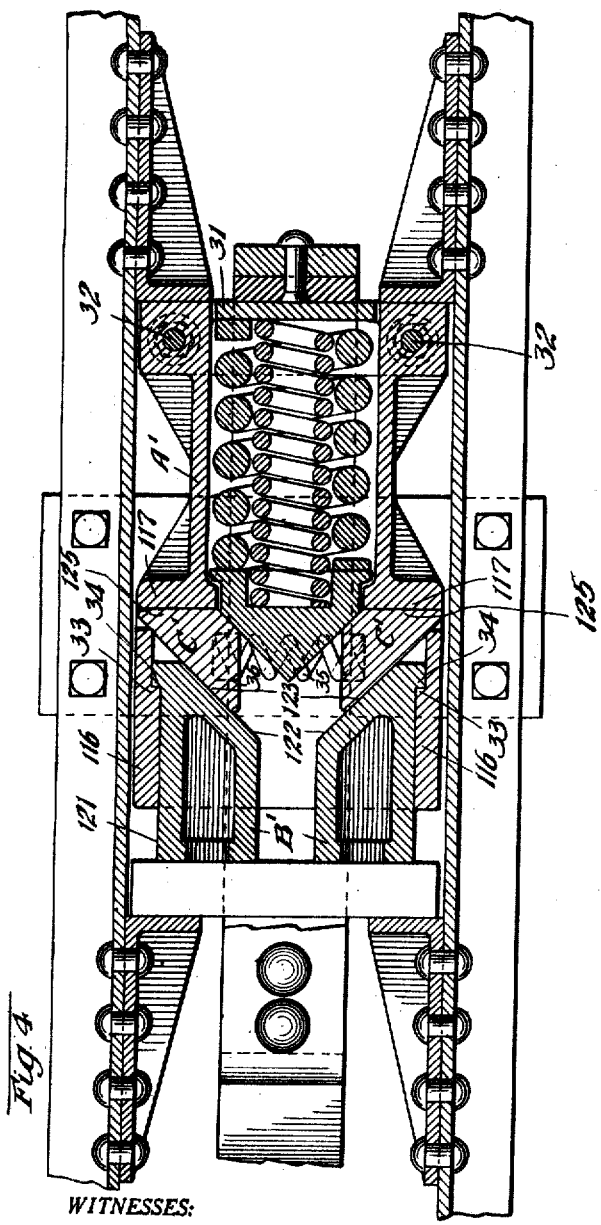
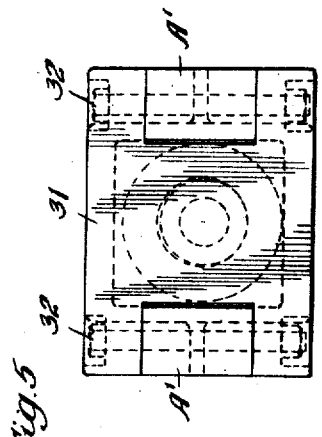
WITNESSES:
Wm. Geiger
INVENTOR.
John F. O'Connor
BY George I. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

HIGH-CAPACITY FRICTION SHOCK-ABSORBING MECHANISM.

1,305,665.   Specification of Letters Patent.   Patented June 3, 1919.

Application filed August 23, 1918. Serial No. 251,076.

*To all whom it may concern:*

Be it known that I, JOHN F. O'CONNOR, a citizen of the United States, residing at Chicago, in the county of Cook and State of Illinois, have invented a certain new and useful Improvement in High-Capacity Friction Shock-Absorbing Mechanism, of which the following is a full, clear, concise, and exact description, reference being had to the accompanying drawings, forming a part of this specification.

This invention relates to improvements in high capacity friction shock absorbing mechanism.

The object of this invention is to provide a friction shock absorbing mechanism more particularly adapted for railway draft riggings, the shock absorbing mechanism being so designed that the spring thereof is compressed simultaneously from opposite ends to thereby obtain high capacity during comparatively short movement of the actuated elements.

In the drawing forming a part of this specification, Figure 1 is a horizontal, longitudinal, sectional view of a portion of a railway draft rigging showing my improvements in connection therewith, the position of the parts being in full release. Fig. 2 is a vertical, transverse, sectional view taken substantially on the line 2—2 of Fig. 1. Fig. 3 is a view similar to Fig. 1 of the shock absorbing mechanism proper only, and illustrating the position of the parts under full compression. The front follower and a portion of the yoke are also indicated in Fig. 3. Fig. 4 is a view similar to Fig. 1 but illustrating a different embodiment of the invention. And Fig. 5 is a rear end elevational view of the friction shell illustrated in Fig. 4.

Referring first to the construction illustrated in Figs. 1, 2 and 3, 10—10 denotes channel draft sills of a railway car to the inner faces of which are secured front lugs 11 and rear lugs 12. The draw bar 13 is operatively connected with the shock absorbing mechanism by any suitable means such as the yoke 14 and all the parts may be supported by a detachable saddle plate 15.

The shock absorbing mechanism proper, as shown, comprises a casting A, a pair of friction shoes B—B, a pair of combined shoes and wedges C, a front wedge follower D, an inner wedge follower E, spring resistance F, spring follower G, and connecting bolt H.

The casting A is of substantially rectangular shape at its forward end and is provided with side friction surfaces 16—16 extending parallel to the axis of the gear and in addition is formed with inwardly extending, comparatively short transverse friction surfaces 17—17. At the rear of the transverse friction surfaces 17, the casting A forms a spring casing 18 for the spring F and at its rear end, the casting A is extended laterally so as to form shoulders 19—19 for coöperation with the rear set of lugs 12.

The draw bar 13 is adapted to engage the front follower 20 of the gear, the follower 20 in turn engaging the outer ends of the friction shoes B. Each of the shoes B is provided on its outer side with a friction surface 21 coöperable with the longitudinal friction surfaces 16 of the friction shell. The shoes B are furthermore provided at their inner ends with wedge faces 22 coöperable with correspondingly arranged wedge faces 23 on the combined friction shoes and wedge C. In addition, the shoes B are formed with laterally extended shoulders 24 arranged to engage the outer edges of the friction shell to limit the inward movement of the parts, as indicated most clearly in Fig. 3.

Each of the combined shoes and wedges C is formed with a friction surface 25 arranged transversely of the axis of the gear and coöperable with the adjacent friction surface 17 of the casting A so that the members C are limited to a lineal transverse movement perpendicular to the axis of the gear. On their inner sides, the members C are also provided with wedge faces 26 and 27 coöperable, respectively, with wedge faces 126 and 127 formed on the followers D and E.

The bolt H has its headed end seated within a suitable countersink in the front follower D and is extended through suitable perforations in the followers D, E and G. The rear end of the bolt H receives a nut 30 so that the parts may be tightened up and the spring F placed under an initial compression if desired.

The operation is as follows: Upon inward movement of the draw bar, the shoes B are forced longitudinally and slide on the friction surfaces 16 of the shell. As the shoes B travel inwardly longitudinally, the combined shoes and wedges C are forced transversely of the gear so that the follower E is forced rearwardly and the follower D is forced outwardly or toward the draw bar, as shown in Fig. 3. The inward movement of the follower E will, of course, compress the spring F from its forward end and the outward movement of the follower D will compress the spring F from its rear end through the bolt H and rear spring follower G. In this manner, assuming 45° angles between the members B, C, D and E, the spring F will be compressed for a distance equal to twice the distance traveled by the shoes B so that I obtain a rapid action with consequent high capacity.

In the construction illustrated in Figs. 4 and 5, the arrangement of sills, lugs, draw bar, yoke and front follower is the same as in the other figures. In the modified construction, the casting A' has the rear wall 31 thereof detachably connected, as by means of the bolts 32. At its forward end, the casting A' is formed with longitudinally extending friction surfaces 116 with which coöperate corresponding friction surfaces 121 on the shoes B'. In addition, the shell A' and the shoes B' are provided with coöperable engaging shoulders 33 and 34 to limit the outward movement of the shoes B' as will be clear from inspection of Fig. 4.

The casting A' is also formed with transversely extending friction surfaces 117 with which coöperate friction surfaces 125 formed on transversely movable friction blocks C'. The blocks C' and shoes B' are provided with coöperable wedge faces 122 and 123 so that inward longitudinal movement of the shoes B' is converted into a transverse movement of the shoes C'.

In order to facilitate release of the parts, and insure the return of the shoes C' to normal position after removal of the pressure on the device, I employ a transversely arranged spring 35 having its ends seated in suitable recesses 36 formed in the shoes C'.

It is thought that the operation of the construction shown in Figs. 4 and 5 will be understood from the previous description given of the operation of the structure shown in Figs. 1, 2 and 3.

I claim:

1. In a friction shock absorbing mechanism, the combination with a friction shell having friction surfaces extending both longitudinally and transversely thereof, of friction shoes co-acting with said longitudinal friction surfaces, combined friction shoes and wedges co-acting with the first named friction shoes and said transverse friction surfaces of the shell, opposed and oppositely movable wedge followers co-acting with said combined friction shoes and wedges, spring means, and means co-acting with said followers for compressing said spring means simultaneously from opposite ends upon separating movement of said wedge followers.

2. In a friction shock absorbing mechanism, the combination with a friction shell having longitudinally and transversely extending friction surfaces, of longitudinally movable friction shoes coöperable with said longitudinal friction surfaces, members having friction surfaces coöperable with said transverse friction surfaces of the shell, said members being restricted to lineal movement transversely of the shell, said members and shoes having co-acting wedge faces so arranged that longitudinal movement of the shoes from normal position forces said members toward the longitudinal axis of the mechanism and toward each other, spring means, a wedge-shaped follower for said spring means, said wedge-shaped follower and said members having coöperable wedge faces, relative approach of said members forcing said wedge follower in a direction axially of the mechanism.

3. In a friction shock absorbing mechanism, the combination with a casting having a friction shell at one end thereof, said friction shell having both longitudinally and transversely extending friction surfaces, of a spring mounted within said casting, longitudinally movable friction shoes coöperable with said longitudinal friction surfaces, said shoes normally having their outer ends extended beyond the end of the shell and adapted to have the actuating pressure applied thereto, transversely movable friction shoes coöperable with said transverse friction surfaces of the shell, said sets of shoes having coöperable engaging wedge faces, a follower at the end of said spring adjacent the transversely movable shoes, said follower and said transversely movable shoes having coöperable wedge engaging faces, said follower being movable in the same direction as said longitudinally movable friction shoes when pressure is applied thereto.

4. In a friction shock absorbing mechanism, the combination with a friction shell having longitudinally and transversely extending friction surfaces, of longitudinally movable friction shoes coöperable with the longitudinal friction surfaces, transversely movable friction shoes coöperable with said transverse friction surfaces, said sets of shoes having coöperable engaging wedge faces, a longitudinally arranged spring, a follower engaging the end of said spring adjacent said transversely movable friction shoes, the latter and said follower having coöperable wedge engaging faces, a follower at the opposite end of said spring, a third follower adjacent the first named follower and having wedge faces coöperable with the transversely movable friction shoes, transverse movement of said shoes separating the adjacent followers, and means extending from the said third follower to the second named follower for moving the latter in unison with the third named follower.

5. In a friction shock absorbing mechanism, the combination with a casting having a friction shell and spring casing, said friction shell being disposed at one end of the casting and including longitudinally extending friction surfaces and friction surfaces at right angles to the longitudinal faces at the inner ends of the latter, the spring casing being disposed inwardly of the friction surfaces, of friction shoes slidable lengthwise of said longitudinal friction surfaces, friction shoes coöperable with and slidable relatively to the friction surfaces disposed at the inner ends of the longitudinal friction surfaces, a spring disposed within the spring casing, and a follower at the end of the spring adjacent the friction shell, said follower being forced rearwardly to compress the spring as the first named friction shoes are forced lengthwise of the longitudinal friction surfaces of the shell.

In witness that I claim the foregoing I have hereunto subscribed my name this 19th day of Aug., 1918.

JOHN F. O'CONNOR.

Copies of this patent may be obtained for five cents each, by addressing the "Commissioner of Patents, Washington, D. C."